US010077878B2

(12) United States Patent
Tsuchiya

(10) Patent No.: US 10,077,878 B2
(45) Date of Patent: Sep. 18, 2018

(54) VEHICLE LIGHTING APPARATUS WITH FRESNEL LENS AND CONVEX LENS ARRAY

(71) Applicant: HONDA MOTOR CO., LTD., Tokyo (JP)

(72) Inventor: Yosuke Tsuchiya, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 103 days.

(21) Appl. No.: 15/249,591

(22) Filed: Aug. 29, 2016

(65) Prior Publication Data

US 2017/0089537 A1 Mar. 30, 2017

(30) Foreign Application Priority Data

Sep. 24, 2015 (JP) ................. 2015-187331

(51) Int. Cl.
*F21S 41/275* (2018.01)
*F21V 5/00* (2018.01)
(Continued)

(52) U.S. Cl.
CPC .......... *F21S 41/275* (2018.01); *B60Q 1/0052* (2013.01); *B60Q 1/0058* (2013.01); *B60Q 1/0683* (2013.01); *B62J 6/02* (2013.01); *F21S 41/143* (2018.01); *F21S 41/19* (2018.01); *F21S 41/255* (2018.01); *F21S 41/265* (2018.01); *F21S 41/285* (2018.01); *F21S 41/295* (2018.01); *F21S 43/14* (2018.01); *F21S 43/31* (2018.01); *F21S 45/33* (2018.01); *F21V 5/007* (2013.01); *F21S 45/47* (2018.01); *F21W 2102/00* (2018.01);
(Continued)

(58) Field of Classification Search
CPC .. F21S 48/1154; F21S 41/295; F21S 48/1216; F21S 48/1258; F21S 41/255; F21S 48/1275; F21S 41/265; F21S 48/1225; F21S 41/285; F21V 5/007; B62J 6/02; B62J 6/04; B60Q 1/0052; B60Q 1/0058; B60Q 1/0683; F21Y 2115/10
See application file for complete search history.

(56) References Cited

U.S. PATENT DOCUMENTS

2002/0034081 A1* 3/2002 Serizawa ............. B60Q 1/2696
362/540
2003/0174509 A1* 9/2003 Futami ................. B60Q 1/0052
362/517

(Continued)

FOREIGN PATENT DOCUMENTS

JP 2013-186951 A 9/2013

*Primary Examiner* — Elmito Breval
*Assistant Examiner* — Michael Chiang
(74) *Attorney, Agent, or Firm* — Westerman, Hattori, Daniels & Adrian, LLP

(57) ABSTRACT

Fresnel lenses are arranged between a board and an outer lens in such a manner as to face at least one of LED chips. The Fresnel lenses are arranged close to a center of the outer lens in front view. Convex and dome-shaped lenses are arranged between the board and the outer lens in such a manner as to face other light sources of the LED chips. The dome-shaped lenses are arranged more radially outward than the Fresnel lenses in front view. Rear surface 89a of the dome-shaped lenses are arranged to be offset toward the LED chips relative to rear surfaces of the Fresnel lenses.

8 Claims, 8 Drawing Sheets

(51) Int. Cl.
*B62J 6/02* (2006.01)
*B60Q 1/00* (2006.01)
*B60Q 1/068* (2006.01)
*F21S 41/19* (2018.01)
*F21S 41/143* (2018.01)
*F21S 41/29* (2018.01)
*F21S 41/20* (2018.01)
*F21S 41/255* (2018.01)
*F21S 41/265* (2018.01)
*F21S 43/14* (2018.01)
*F21S 43/31* (2018.01)
*F21S 45/33* (2018.01)
*F21Y 115/10* (2016.01)
*F21S 45/47* (2018.01)
*F21W 107/17* (2018.01)
*F21W 102/00* (2018.01)

(52) U.S. Cl.
CPC ...... *F21W 2107/17* (2018.01); *F21Y 2115/10* (2016.08)

(56) References Cited

U.S. PATENT DOCUMENTS

2011/0063730 A1\* 3/2011 Shyu ................ B29D 11/00298
  359/619
2017/0036591 A1\* 2/2017 Chen .................... B60Q 1/0052

\* cited by examiner

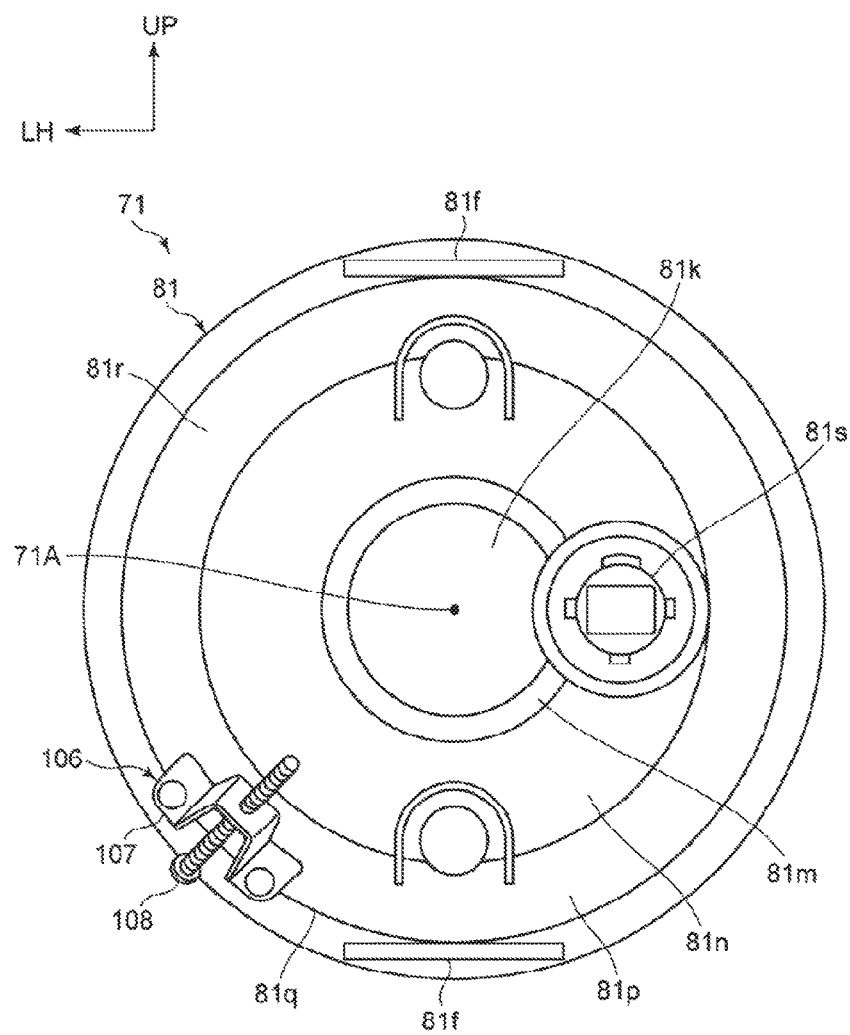

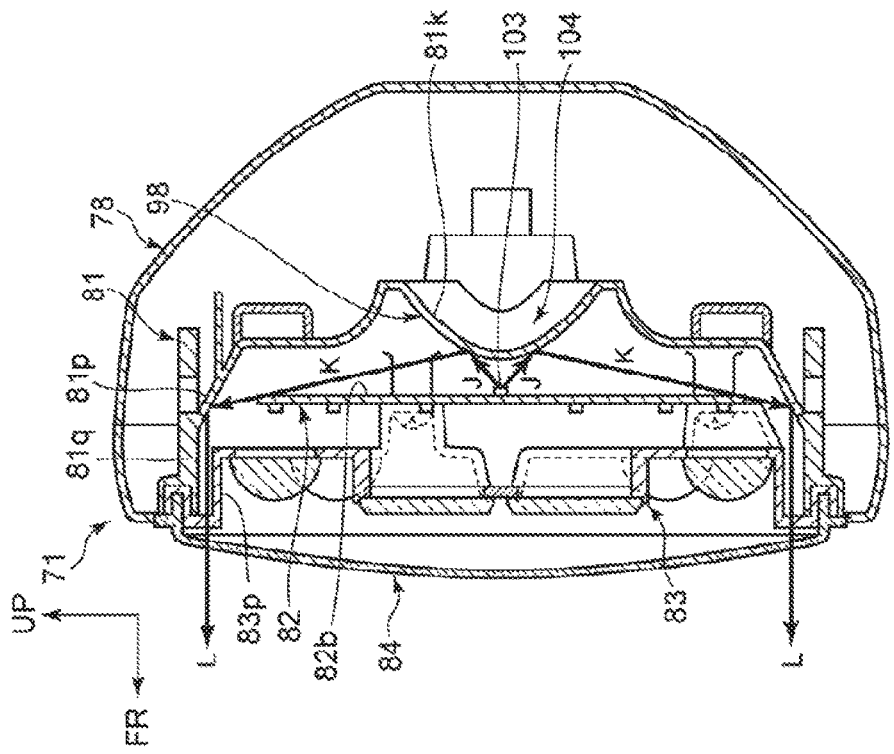
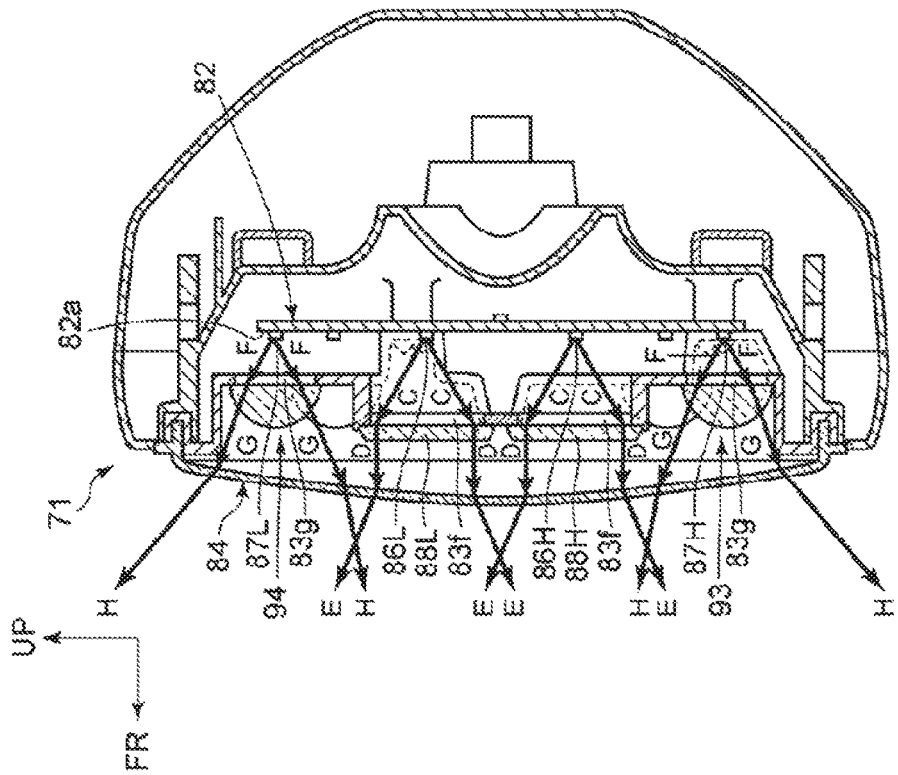

VEHICLE LIGHTING APPARATUS WITH FRESNEL LENS AND CONVEX LENS ARRAY

TECHNICAL FIELD

The present disclosure relates to a lighting apparatus for a vehicle.

BACKGROUND

A headlight using a Fresnel lens is known (refer, for example, to Japanese Patent Laid-Open No. 2013-186951).

SUMMARY

In the case of a headlight having Fresnel lenses, in order to secure an amount of light irradiated and an irradiation area with a small number of light sources, it is necessary to increase luminosity of the light sources and provide a distance between the Fresnel lenses and an outer lens. This has led to a larger longitudinal width of the lighting apparatus, thus resulting in a larger-sized lighting apparatus.

In light of the foregoing, it is preferable to provide a lighting apparatus for a vehicle that can be downsized while at the same time securing an amount of light irradiated and an irradiation area.

In order to solve the above problem, according to the present disclosure, there is provided a lighting apparatus for a vehicle including a lamp body (81) and an outer lens (84) that covers a front area of the lamp body (81). A board (82) is arranged in a space surrounded by the lamp body (81) and the outer lens (84). The board (82) has light-emitting diode (LED) light sources (86H, 86L, 87H, 87L, 103). The outer lens (84) is round and bends outward in a projection manner at its center. The board (82) having the plurality of LED light sources (86H, 86L, 87H, 87L) arranged apart from each other is orthogonal to a direction faced by the outer lens (84). Fresnel lenses (88H, 88L) are arranged between the board (82) and the outer lens (84) in such a manner as to face at least one of the LED light sources (86H, 86L, 87H, 87L). The Fresnel lenses (88H, 88L) are arranged close to a center of the outer lens (84) in front view. Convex and dome-shaped lenses (89H, 89L) are arranged between the board (82) and the outer lens (84) in such a manner as to face other light sources of the LED light sources (86H, 86L, 87H, 87L). The dome-shaped lenses (89H, 89L) are arranged more circumferentially outward on the outer lens (84) than the Fresnel lenses (88H, 88L) in front view. LED light source side end portions (89a) of the dome-shaped lenses (89H, 89L) are arranged to be offset toward the LED light sources (86H, 86L, 87H, 87L) relative to LED light source side end portions (88a) of the Fresnel lenses (88H, 88L).

In the above configuration, all the LED light sources (86H, 86L, 87H, 87L, 103) may be provided directly on the board (82) that is formed in a single plane.

Further, in the above configuration, the lighting apparatus (71) may include a lens support (83) supported on the lamp body (81). The lens support (83) includes a first step portion (83c) and a second step portion (83d). The first step portion (83c) is formed on a side of the outer lens (84). The second step portion (83d) is formed more circumferentially outward than the first step portion (83c) and closer to the LED light sources (86H, 86L, 87H, 87L) than the first step portion (83c). The Fresnel lenses (88H, 88L) are provided on the first step portion (83c), and the dome-shaped lenses (89H, 89L) are provided on the second step portion (83d).

Further, in the above configuration, the Fresnel lenses (88H, 88L) may be arranged, each in association with one of the plurality of LED light sources (86H, 86L) arranged close to a center of the board (82) of the LED light sources (86H, 86L, 87H, 87L), and the plurality of adjacent Fresnel lenses (88H, 88L) may be arranged in proximity to each other.

Still further, in the above configuration, the LED light sources (86H, 86L) arranged close to the center of the board (82) may be arranged side by side in two directions.

Still further, in the above configuration, the LED light sources (87H, 87L) arranged close to an outer circumference of the board (82) may be arranged in an annular manner externally to the LED light sources (86H, 86L) that are arranged close to the center of the board (82), and the dome-shaped lenses (89H, 89L) may be provided in association with the LED light sources (87H, 87L) that are arranged close to the outer circumference of the board (82), and the dome-shaped lenses (89H, 89L) may be provided, in front view, between the Fresnel lenses (88H, 88L) and an outer circumferential edge of the outer lens (84).

Still further, in the above configuration, the outer lens (84) may be fitted and fastened to an outer circumferential edge of the lamp body (81), and support arms (83b) may be formed in the lens support (83) in such a manner as to extend radially outward in diametric directions, and the support arms (83b) may be fastened by being sandwiched between the lamp body (81) and the outer lens (84).

Still further, in the above configuration, the LED light source (103) is provided on a surface of the board (82) on a side of the lamp body (81), and a reflecting mirror section (98) provided on an inner surface of the lamp body (81) may reflect light from the LED light source (103), guide light toward the outer lens (84), and irradiate light externally. In the above explanation of the exemplary embodiment, specific elements with their reference numerals are indicated by using brackets. These specific elements are presented as mere examples in order to facilitate understanding, and thus, should not be interpreted as any limitation to the accompanying claims.

An outer lens according to the present disclosure is round and bends outward in a projection manner at its center. A board having a plurality of LED light sources arranged apart from each other is orthogonal to a direction faced by the outer lens. Fresnel lenses are arranged between the board and the outer lens in such a manner as to face at least one of the LED light sources. The Fresnel lenses are arranged close to a center of the outer lens in front view. Convex and dome-shaped lenses are arranged between the board and the outer lens in such a manner as to face other light sources of the LED light sources. The convex and dome-shaped lenses are arranged more circumferentially outward on the outer lens than the Fresnel lenses in front view. LED light source side end portions of the dome-shaped lenses are arranged to be offset toward the LED light sources relative to LED light source side end portions of the Fresnel lenses. This brings the thin Fresnel lenses close to the outer lens, thus keeping rearward protrusion thereof to a minimum. On the other hand, the convex and thick dome-shaped lenses whose distance to the light sources is easier to adjust than the Fresnel lenses are arranged more circumferentially outward on the outer lens. Arrangement of two kinds of lenses along an outer front surface of the outer lens contributes to a reduced distance as a whole between the LED light sources and the outer lens. This makes a lighting apparatus longitudinally less wide despite having Fresnel lenses, thus providing a more compact lighting apparatus and securing an amount of light irradiated and an irradiation area.

Further, all the LED light sources are provided directly on the board formed in a single plane, contributing to further downsizing and reduction in thickness.

Still further, the lighting apparatus includes a lens support supported on a lamp body. The lens support includes first and second step portions. The first step portion is formed on the side of the outer lens. The second step portion is formed more circumferentially outward than the first step portion and closer to the LED light sources than the first step portion. The Fresnel lenses are provided on the first step portion, and the dome-shaped lenses are provided on the second step portion. Arrangement of two kinds of lenses on the lens support having the first and second step portions provides a simpler parts configuration of the lighting apparatus without increasing the parts count of the lens support for each lens, thus keeping the upsizing of the lighting apparatus to a minimum.

The Fresnel lenses are arranged, each in association with one of the plurality of LED light sources arranged close to a center of the board of the LED light sources, and the plurality of adjacent Fresnel lenses are arranged in proximity to each other, thus contributing to further downsizing of the lighting apparatus in a diametric direction.

The LED light sources arranged close to the center of the board are arranged side by side in two directions, thus contributing to further downsizing of the lighting apparatus in a diametric direction.

Still further, the LED light sources arranged close to an outer circumference of the board are arranged in an annular manner externally to the LED light sources that are arranged close to the center of the board, and the dome-shaped lenses are provided in association with the LED light sources that are arranged close to the outer circumference of the board, and the dome-shaped lenses are provided, in front view, between the Fresnel lenses and an outer circumferential edge of the outer lens. This allows for the lighting apparatus to emit light uniformly along an outer circumference of a round lamp body.

Still further, the outer lens is fitted and fastened to an outer circumferential edge of the lamp body, and support arms are formed in the lens support in such a manner as to extend radially outward in diametric directions. The support arms may be fastened by being sandwiched between the lamp body and the outer lens. This contributes to a small parts count and improved appearance with no blindfold as compared to forming a special fastening section of the lens support, for example, with a tightening member.

Still further, the LED light source is provided on a surface of the board on the side of the lamp body, and a reflecting mirror section provided on an inner surface of the lamp body reflects light from the LED light source, guides light toward the outer lens, and irradiates light externally. This allows for a plurality of light sources that are required in terms of regulations to be provided on a single board, thus keeping increase in thickness of the lighting apparatus to a minimum as much as possible.

BRIEF DESCRIPTION OF THE DRAWINGS

FIG. 6 is a rear view illustrating a lamp body.

FIGS. 7(A), 7(B) depict operation diagrams describing light emission by the headlight, and FIG. 7(A) is a operation diagram describing travel of light emitted from LED chips on a front surface of a board, and FIG. 7(B) is a operation diagram describing travel of light emitted from an LED chip on a rear surface of the board.

DETAILED DESCRIPTION

Figure 1:
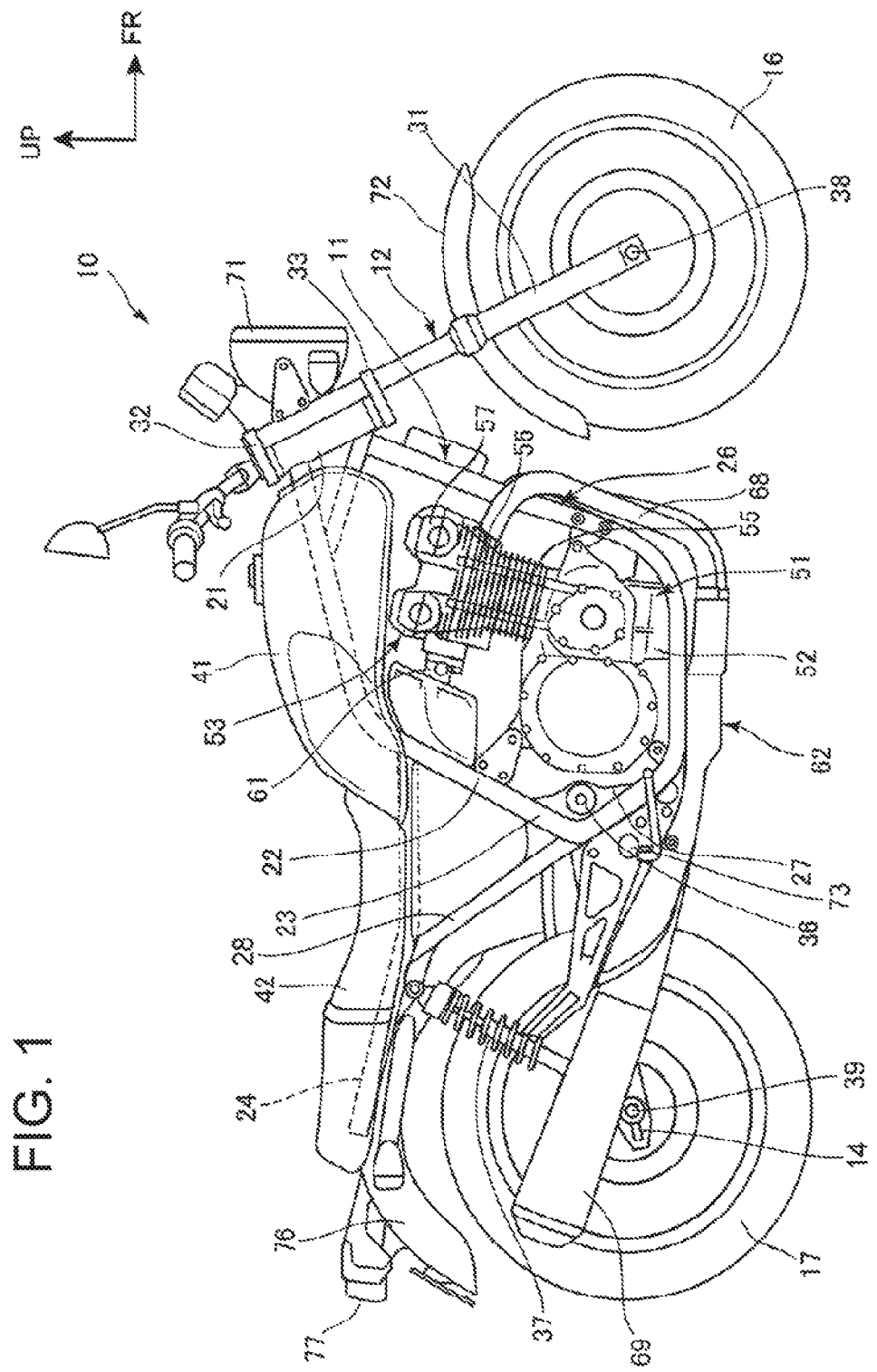
FIG. 1 is a right side view of a motorcycle having a headlight according to one embodiment of the present invention.

A description will be given below of an embodiment of the present invention with reference to the accompanying drawings. It should be noted that longitudinal, horizontal, vertical, and other directions in the description are the same as those relative to a vehicle body unless otherwise specified. Further, reference symbol FR depicted in the drawings represents a forward direction of the vehicle body, reference symbol UP represents an upward direction of the vehicle body, and reference symbol LH represents a leftward direction of the vehicle body.

FIG. 1 is a right side view of a motorcycle 10 having a headlight 71 according to one embodiment of the present invention.

The motorcycle 10 is a saddle type vehicle that has a front fork 12 on a front end portion of a vehicle body frame 11. A swing arm 14 is provided on a lower portion of the vehicle body frame 11. A front wheel 16 is supported on a lower end portion of the front fork 12, and a rear wheel 17 is supported on a rear end portion of the swing arm 14.

The vehicle body frame 11 includes a head pipe 21, a pair of left and right main frames 22, a pair of left and right center frames 23, a pair of left and right sheet rails 24, a pair of left and right down frames 26, a pair of left and right pivot plates 27, and a pair of left and right rear frames 28.

The head pipe 21 makes up the front end portion of the vehicle body frame 11 with the front fork 12 steerably supported on the head pipe 21. Each of the left and right main frames 22 extends downward and rearward from an upper portion of the head pipe 21. The center frames 23 are formed integrally with lower portions of the main frames 22, extending downward. The sheet rails 24 extend rearward from sides of the left and right main frames 22, supporting a sheet 42. The down frames 26 are connected to a lower portion of the head pipe 21, extending under the main frames 22 diagonally rearward and downward and rearward, being connected to the center frames 23. The pivot plates 27 are attached to front portions of the center frames 23, supporting a pivot shaft 36 that extends in a direction of vehicle width. A front end portion of the swing arm 14 is supported in a vertically swingable manner on the pivot shaft 36. The rear frames 28 extend rearward and upward from bending portions of the center frames 23, being connected to intermediate portions of the sheet rails 24.

The front fork 12 includes a pair of left and right telescopic fork tubes 31, top and bottom bridges 32 and 33, and a steering stem (not depicted). The top and bottom bridges 32 and 33 connect the left and right fork tubes 31. The steering stem connects the top and bottom bridges 32 and 33 vertically. The steering stem is rotatably supported on the head pipe 21. The front wheel 16 is supported on a lower end portion of the front fork 12 via a wheel shaft 38.

A lower end portion of a rear cushion unit 37 is connected to the rear end portion of the swing arm 14. The rear wheel 17 is supported on the rear end portion of the swing arm 14 via a wheel shaft 39. An upper end portion of the rear cushion unit 37 is connected to lower portions of the sheet rails 24.

A fuel tank 41 and a sheet 42 are supported on an upper portion of the vehicle body frame 11. The fuel tank 41 is arranged behind the head pipe 21. The sheet 42 is arranged behind the fuel tank 41.

A multi-cylinder engine 51 is arranged in a space under the fuel tank 41 and surrounded by the vehicle body frame 11.

The engine 51 is supported on the main frames 22, the down frames 26, and other members, and includes a crankcase 52 and a cylinder section 53. The cylinder section 53 rises from a front portion of the crankcase 52. The cylinder section 53 includes a cylinder block 55, a cylinder head 56, and a head cover 57 that are arranged in this order from the side of the crankcase 52.

An air intake apparatus 61 is connected to a rear portion of the cylinder head 56, and an air exhaust apparatus 62 is connected to a front portion of the cylinder head 56. The air intake apparatus 61 includes a throttle body, an air cleaner box, and so on. The air exhaust apparatus 62 includes a plurality of exhaust pipes 68 and a muffler 69. The exhaust pipes 68 extend downward and rearward. The muffler 69 is connected to rear end portions of the exhaust pipes 68.

The headlight 71 having LED light sources is attached above the front fork 12.

Reference symbol 72 depicted in the figure is a front fender that covers the front wheel 16 from above, 73 is a driver's step, 76 is a rear fender that covers the rear wheel 17 from above, and 77 is a tail lamp.

Figure 2:
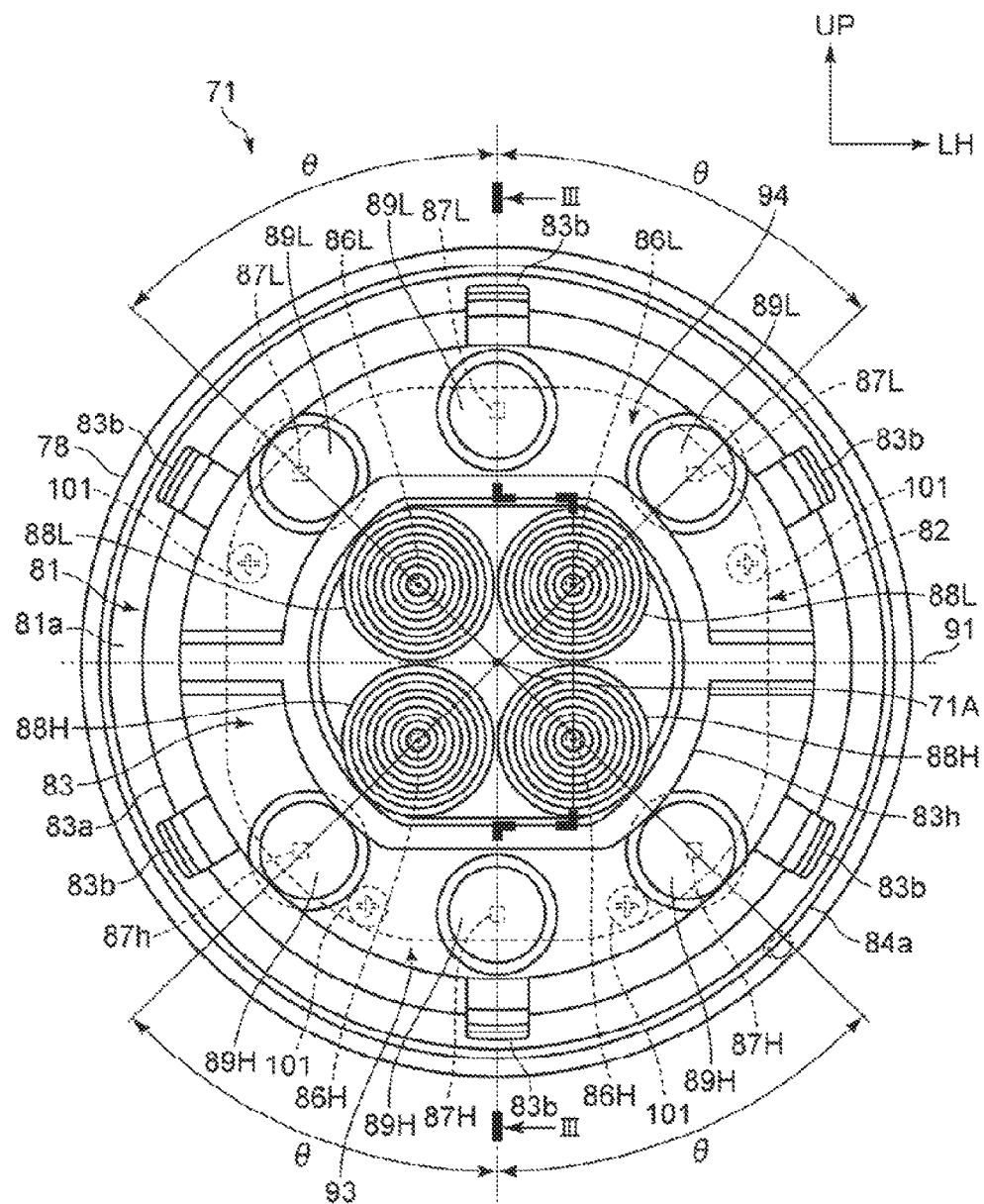
FIG. 2 is a front view illustrating the headlight.

FIG. 2 is a front view illustrating the headlight 71.

The headlight 71 includes a lamp body 81, a board 82, a lens support 83, and a clear and round outer lens 84. The lamp body 81 is supported on a housing 78 that is attached to the front fork 12 (refer to FIG. 1). The board 82 and the lens support 83 are attached to the lamp body 81. The outer lens 84 (refer to FIG. 3) is arranged in front of the lamp body 81 (on the front side in the figure) and attached to an outer circumferential edge of the lamp body 81. It should be noted that reference symbol 71A is a center of the headlight 71 in front view and also a center of the lamp body 81, the board 82, the lens support 83, and the outer lens 84 described above.

The housing 78 accommodates the headlight 71, harnesses connected to the headlight 71, and other components for protection.

The board 82 is formed approximately octagonal in outer shape, with a plurality of LED chips 86H, 86L, 87H, and 87L attached to a front surface of the board 82. It should be noted that although identical in structure, the plurality of LED chips 86H, 86L, 87H, and 87L are assigned different reference symbols in accordance with positions of the board 82 where the LED chips are attached.

The plurality of LED chips 86H and 86L are arranged side by side both vertically and horizontally (along the vehicle width) in a center portion of the board 82 with a spacing therebetween. The plurality of LED chips 86H and 86L are also arranged equidistant or approximately equidistant from the center 71A.

The plurality of LED chips 87H and 87L are arranged farther and more circumferentially outward from the center 71A than the plurality of LED chips 86H and 86L. The plurality of LED chips 87H and 87L are also arranged equidistant or approximately equidistant from the center 71A in an annular manner, with the adjacent LED chips 87H and 87L arranged an angle $\theta$ apart from each other.

The lens support 83 is supported on an outer circumferential edge 81a of the lamp body 81 by a plurality of support arms 83b that extend radially outward from an outer circumferential edge 83a of the lens support 83. A plurality of thin and disk-shaped Fresnel lenses 88H and 88L and a plurality of convex and dome-shaped lenses 89H and 89L are attached to the lens support 83.

The plurality of Fresnel lenses 88H are arranged individually in front of the plurality of LED chips 86H. The plurality of Fresnel lenses 88L are arranged individually in front of the plurality of LED chips 86L.

Further, the plurality of dome-shaped lenses 89H are arranged individually in front of the plurality of LED chips 87H. The plurality of dome-shaped lenses 89L are arranged individually in front of the plurality of LED chips 87L.

The Fresnel lenses 88H and 88L are arranged side by side vertically and horizontally, and the adjacent Fresnel lenses 88H and 88L are arranged in proximity to each other.

The plurality of dome-shaped lenses 89H and 89L are arranged around the plurality of Fresnel lenses 88H and 88L in an annular manner. Further, the plurality of dome-shaped lenses 89H and 89L are arranged diametrically outward and away from the plurality of Fresnel lenses 88H and 88L and diametrically inward and away from an outer circumferential edge 84a of the outer lens 84.

The plurality of LED chips 86H and 87H, the plurality of Fresnel lenses 88H, and the plurality of dome-shaped lenses 89H, are located under a straight line 91 and make up a lower light section 93 that emits a driving beam (high beam). The straight line 91 is drawn horizontally to pass through the center 71A.

The plurality of LED chips 86L and 87L, the plurality of Fresnel lenses 88L, and the plurality of dome-shaped lenses 89L, are located above the straight line 91 and make up an upper light section 94 that emits a passing beam (low beam).

Figure 3:
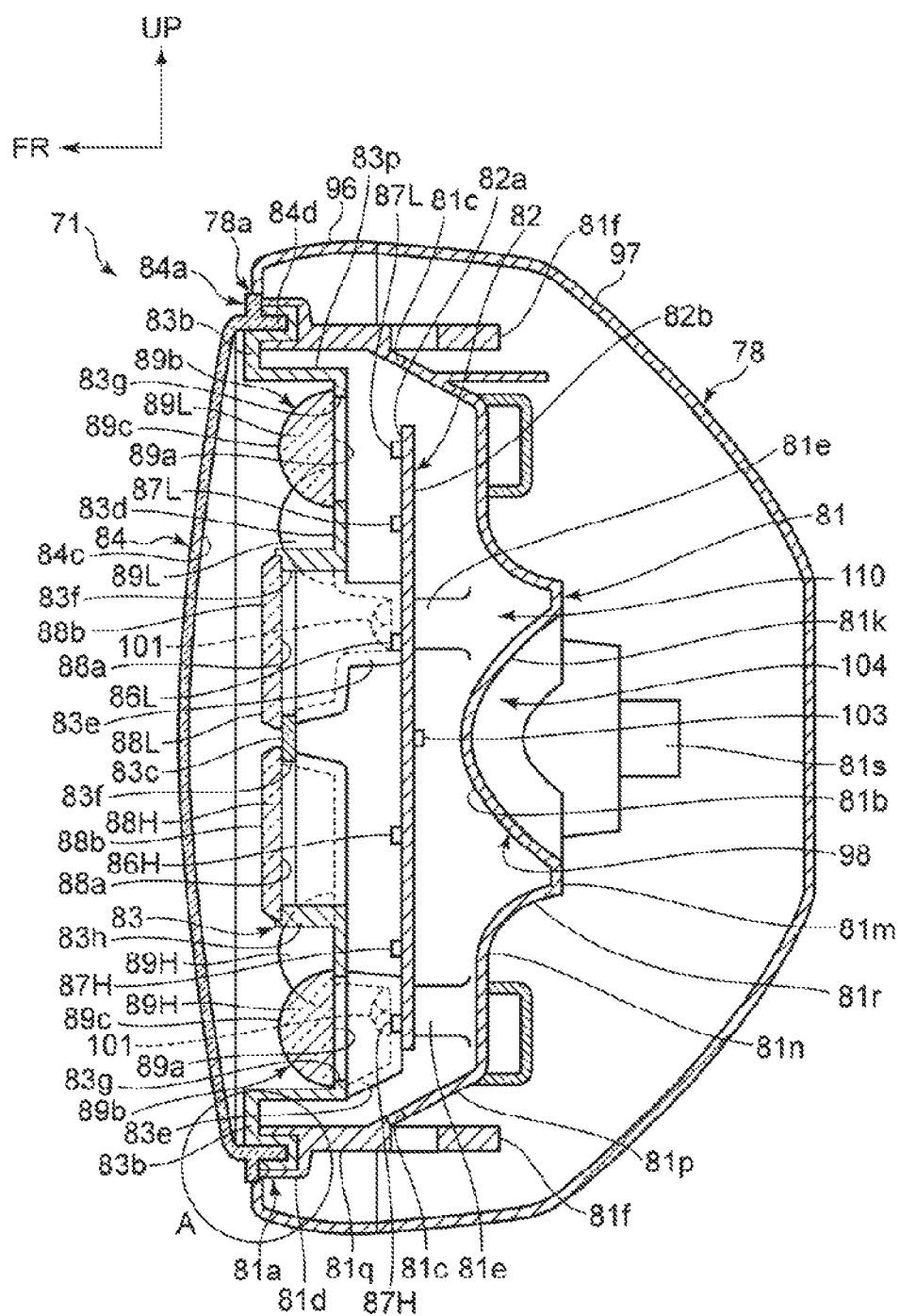
FIG. 3 is a sectional view along line III-III in FIG. 2.

FIG. 3 is a sectional view along line III-III in FIG. 2.

The headlight 71 is accommodated in the housing 78, with the outer lens 84 externally exposed from an opening 78a that is provided in a front portion of the housing 78.

The housing 78 is a part having a longitudinal two-piece structure that includes a front housing 96 and a rear housing 97.

The lamp body 81 is made of resin and a cup-shaped integrally molded component that includes a central bulging portion 81k, a first disk portion 81m, a second disk portion 81n, a taper portion 81p, a cylindrical portion 81q, and a body fitting portion 81d.

The central bulging portion 81k is provided to bulge forward from a center portion of the lamp body 81. The first disk portion 81m extends diagonally outward from an outer circumferential edge of the central bulging portion 81k. The second disk portion 81n bends forward from an outer circumferential edge of the first disk portion 81m, extending further diametrically outward. The taper portion 81p increases in diameter gradually as it runs forward from an outer circumferential edge of the second disk portion 81n. The cylindrical portion 81q extends forward cylindrically from a front end of the taper portion 81p. The body fitting portion 81d is provided at a front end of the cylindrical portion 81q in an annular manner.

The lamp body 81 has a reflector 98 formed on whole or given part of an inner surface 81b thereof. The lamp body 81 also has a plurality of ventilation holes 81c made in the taper portion 81p and the body fitting portion 81d formed on the outer circumferential edge 81a. The support arms 83b of the lens support 83 are fitted into the body fitting portion 81d.

Further, a plurality of columnar or cylindrical boss portions 81e that protrude forward (toward the outer lens 84) are formed on the lamp body 81. The board 82 and the lens support 83 are clamped together to the plurality of boss portions 81e with each of screws 101.

A plurality of supported portions 81f supported by the housing 78 are formed on an outer circumferential portion of a rear surface 81r of the lamp body 81.

The board 82 is formed in the shape of a flat plate and arranged vertical (orthogonal) to a direction faced by the outer lens 84, i.e., a direction in which light is irradiated from the headlight 71 (forward from the headlight 71). The plurality of LED chips 86H, 86L, 87H, and 87L are attached to a front surface 82a of the board 82, and the single LED chip 103 is attached to a center of a rear surface 82b of the board 82 (center 71A of the board 82 (refer to FIG. 2)).

The LED chip 103 makes up a position light 104 together with the above described outer lens 84 and the reflector 98.

The lens support 83 is made of resin and integrally formed from a front side step portion 83c, a rear side step portion 83d, an inner circumferential wall 83h, an outer circumferential wall 83p, the plurality of support arms 83b, and a plurality of leg portions 83e.

The plurality of Fresnel lenses 88H and 88L are attached to the front side step portion 83c. The rear side step portion 83d is arranged behind the front side step portion 83c (on the side of the board 82), with the dome-shaped lenses 89H and 89L attached to the rear side step portion 83d. The inner circumferential wall 83h connects an outer circumferential edge of the front side step portion 83c and an inner circumferential edge of the rear side step portion 83d. The outer circumferential wall 83p extends forward in a tubular manner from an outer circumferential edge of the rear side step portion 83d. The plurality of support arms 83b extend diametrically outward from the outer circumferential wall 83p. The plurality of leg portions 83e are formed in such a manner as to protrude from the rear side step portion 83d toward the board 82 such that the leg portions 83e are fastened to the lamp body 81 via the board 82.

The front side step portion 83c and the rear side step portion 83d are provided parallel to the board 82.

The front side step portion 83c has Fresnel lens openings 83f provided individually behind the Fresnel lenses 88H and 88L such that light emitted from the LED chips 86H and 86L on a center side strikes the Fresnel lenses 88H and 88L through the Fresnel lens openings 83f.

The rear side step portion 83d has dome-shaped lens openings 83g provided individually behind the dome-shaped lenses 89H and 89L such that light emitted from the LED chips 87H and 87L on an outer circumference side strikes the dome-shaped lenses 89H and 89L through the dome-shaped lens openings 83g. It should be noted that reference symbol 83h is an inner wall formed between the front side step portion 83c and the rear side step portion 83d.

Thus, the Fresnel lenses 88H and 88L are arranged on the front side step portion 83c, and the dome-shaped lenses 89H and 89L are arranged on the rear side step portion 83d, thus making it possible to arrange rear surfaces 89a (on the side of the board 82) of the dome-shaped lenses 89H and 89L to be offset relative to rear surfaces 88a of the Fresnel lenses 88H and 88L. Therefore, it is possible to arrange front end portions 89c of front surfaces 89b of the dome-shaped lenses 89H and 89L approximately at the same longitudinal positions as front surfaces 88b of the Fresnel lenses 88H and 88L in the longitudinal direction of the headlight 71. This keeps, to a minimum, forward protrusion of the front surfaces 88b of the Fresnel lenses 88H and 88L and the front end portions 89c of the front surfaces 89b of the dome-shaped lenses 89H and 89L. This contributes to a reduced longitudinal width of the headlight 71, thus downsizing the headlight 71.

The outer lens 84 bends in such a manner as to be projection forward, and an inner surface 84c has lens cuts to reflect light that strikes the inner surface 84c toward a given direction. An annular projection portion 84d is formed on the outer circumferential edge 84a of the outer lens 84 in such a manner as to protrude rearward. The annular projection portion 84d sandwiches the plurality of support arms 83b of the lens support 83 between the annular projection portion 84d and the body fitting portion 81d while at the same time being fitted into the body fitting portion 81d of the outer circumferential edge 81a of the lamp body 81.

Figure 4:
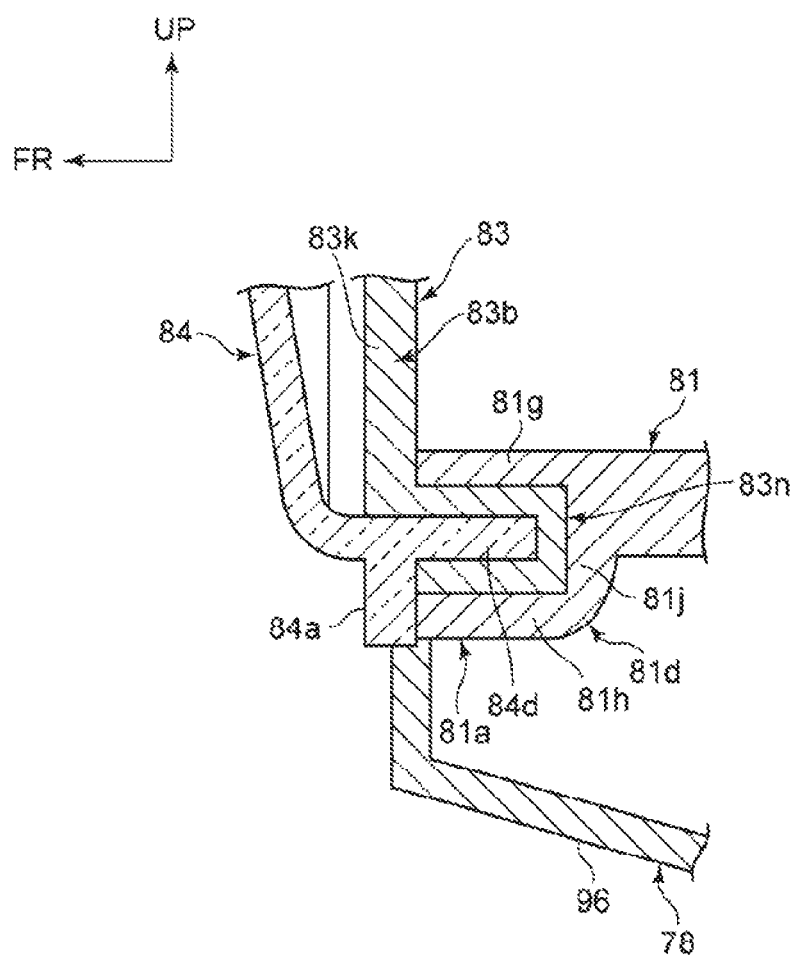
FIG. 4 is an enlarged view of an area A in FIG. 3.

FIG. 4 is an enlarged view of an area A in FIG. 3.

The body fitting portion 81d of the lamp body 81 is U-shaped in section and includes an inner circumferential wall 81g, an outer circumferential wall 81h, and a bottom wall 81j that are provided integrally with the outer circumferential edge 81a of the lamp body 81. The inner circumferential wall 81g and the outer circumferential wall 81h are tubular. The outer circumferential wall 81h is provided in such a manner as to surround a diametrically outer area of the inner circumferential wall 81g. End portions of the inner circumferential wall 81g and the outer circumferential wall 81h are connected together by the annular bottom wall 81j.

The support arm 83b of the lens support 83 includes an arm portion 83k and a support fitting portion 83n. The arm portion 83k extends diametrically outward from the outer circumferential wall 83p (refer to FIG. 3). The support fitting portion 83n is U-shaped in section and formed on an end portion of the arm portion 83k. The support fitting portion 83n is formed in such a manner as to be open toward the outer circumferential edge 84a of the outer lens 84 and inserted in the body fitting portion 81d of the lamp body 81. Further, the annular projection portion 84d of the outer lens 84 is inserted in the support fitting portion 83n, thus the support fitting portion 83n is sandwiched and fastened between the body fitting portion 81d and the annular projection portion 84d of the outer lens 84.

Thus, the plurality of support arms 83b of the lens support 83 are sandwiched and fastened between the lamp body 81 and the outer lens 84, thus eliminating the need for a special fastening member for fastening the lens support 83. This makes a fastening structure simple, thus keeping a parts count to a minimum. Further, there is no need for a fastening member, thus keeping the appearance intact. Still further, there is no need for a cover member for covering the fastening member.

Figure 5:
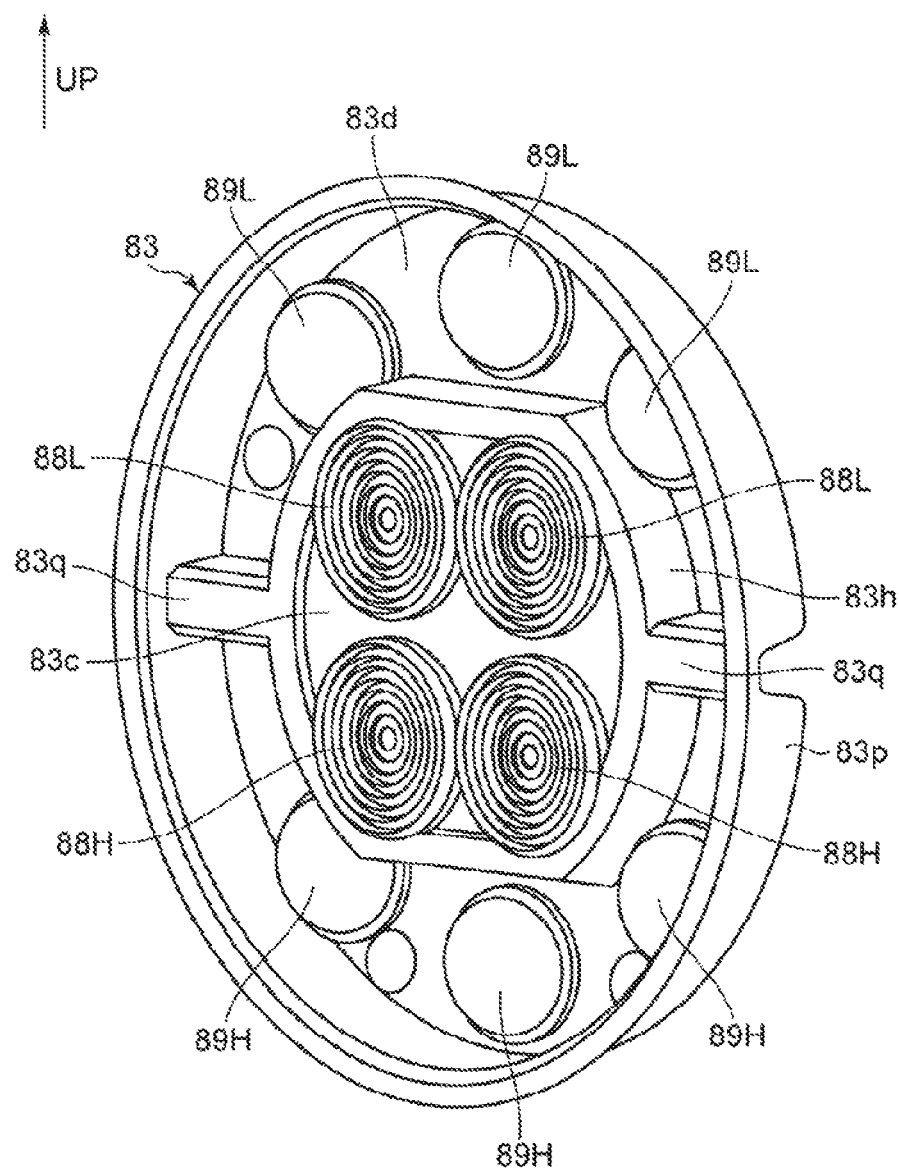
FIG. 5 is a perspective view illustrating a lens support.

FIG. 5 is a perspective view illustrating the lens support 83. It should be noted that the plurality of support arms 83b of the lens support 83 (refer to FIG. 3) are not depicted in this drawing.

The lens support 83 includes the front side step portion 83c and the rear side step portion 83d. The plurality of Fresnel lenses 88H and 88L are arranged on the front side step portion 83c. The plurality of dome-shaped lenses 89H and 89L are arranged on the rear side step portion 83d. The front side step portion 83c and the rear side step portion 83d are connected by the inner circumferential wall 83h. The outer circumferential wall 83p that protrudes forward is formed integrally with the outer circumferential edge of the rear side step portion 83d. The plurality of support arms 83b (refer to FIGS. 2 and 3) are provided on the outer circumferential wall 83p.

Further, the inner circumferential wall 83h and the outer circumferential wall 83p are connected integrally with a pair of left and right connecting walls 83q. Provision of the connecting walls 83q contributes to improved rigidity of the lens support 83.

The Fresnel lenses 88H and 88L have each a plurality of concentric lenses in the shape of an arch in section on the front surface, thus allowing for collection of light with minimal thickness. This makes it possible to irradiate light far from the vehicle.

The dome-shaped lenses 89H and 89L are each in the shape of a projection dome, permitting easy scattering of light and irradiation of light over a wide area close to the vehicle.

FIG. 6 is a rear view illustrating the lamp body 81.

The lamp body 81 has, on a rear surface 81r thereof, a connector connection section 81s that is located at a sideways position from the center 71A. Connector harnesses are connected to the connector connection section 81s to supply power to the LED chips 86H, 86L, 87H, and 87L (refer to FIG. 2) so as to emit light.

An optical axis adjustment section 106 is provided at a sideways position from a lower end portion of the lamp body 81 to adjust an optical axis of the headlight 71. The optical axis adjustment section 106 includes a base portion 107 and a screw 108. The base portion 107 is attached to the rear surface 81r of the lamp body 81. The screw 108 is screwed to the base portion 107. A tip portion of the screw 108 engages with the housing 78 (refer to FIG. 3) in a rotatable manner. As the screw 108 is rotated, the headlight 71 tilts relative to the housing 78, thus allowing for adjustment of the optical axis.

As described above, the connector connection section 81s is provided at a sideways position from the central bulging portion 81k of the lamp body 81 (i.e., on the second disk portion 81n), thus eliminating possible impact on the reflector 98 of the inner surface 81b of the lamp body 81 depicted in FIG. 3 for effective functioning of the reflector 98.

A description will be given next of operations of how the headlight 71 described above emits light.

FIGS. 7(A), 7(B) depict operation diagrams describing light emission by the headlight 71.

FIG. 7(A) is a operation diagram describing travel of light emitted from the LED chips 86H, 86L, 87H, and 87L on the front surface 82a of the board 82, and FIG. 7(B) is a operation diagram describing travel of light emitted from the LED chip 103 on the rear surface 82b of the board 82.

When the LED chips 86H and 86L on the center side emit light as illustrated in FIG. 7(A), the light passes through the Fresnel lens openings 83f, reaching the Fresnel lenses 88H and 88L as depicted by arrows C. In the Fresnel lenses 88H and 88L, light scattered from the LED chips 86H and 86L is collected and transformed into parallel or approximately parallel light as depicted by arrows D. Then, the parallel light is refracted by the outer lens 84 as depicted by arrows E and irradiated in given directions (over an area Z far from the vehicle).

On the other hand, when the LED chips 87H and 87L on the outer circumference side emit light, the light passes through the dome-shaped lens openings 83g, reaching the dome-shaped lenses 89H and 89L as depicted by arrows F. In the dome-shaped lenses 89H and 89L, the light is scattered as depicted by arrows G, and further refracted by the outer lens 84 as depicted by arrows H and irradiated in given directions (over an area closer and larger than the above described area Z).

This makes it possible to secure an amount of light irradiated and an irradiation area for the headlight 71.

It should be noted that although the high beam of the lower light section 93 and the passing beam of the upper light section 94 are actually emitted separately, it was described above that light emission from the lower light section 93 and the upper light section 94 take place at the same time for convenience.

When the LED chip 103 on the rear surface 82b of the board 82 emits light as illustrated in FIG. 7(B), the light heads toward the reflector 98 of the lamp body 81 as depicted by arrows J, being reflected by the reflector 98 of the central bulging portion 81k as depicted by arrows K. Then, the light is reflected by the refractor 98 of the taper portion 81p as depicted by arrows L, heading forward through an annular spacing between the cylindrical portion 81q of the lamp body 81 and the outer circumferential wall 83p of the lens support 83 and being irradiated in given directions through the outer lens 84. Therefore, when the headlight 71 is seen from front, the light passing through the outer lens 84 is circular as the position light 104.

Thus, it is possible to add a function of the position light 104 in addition to a function of the headlight 71 simply by providing the LED chip 103 on the rear surface 82b of the single board 82 and the reflector 98 on the inner surface 81b of the lamp body 81. This contributes to a reduced parts count and reduced cost as compared to providing a position light separately from the headlight 71. Further, the position light 104 can be formed by using a narrow space between the board 82 and the lamp body 81. This contributes to a reduced longitudinal width of the headlight 71, thus downsizing the headlight 71.

A description will be given next of operations of how the headlight 71 described above is ventilated.

Figure 8:
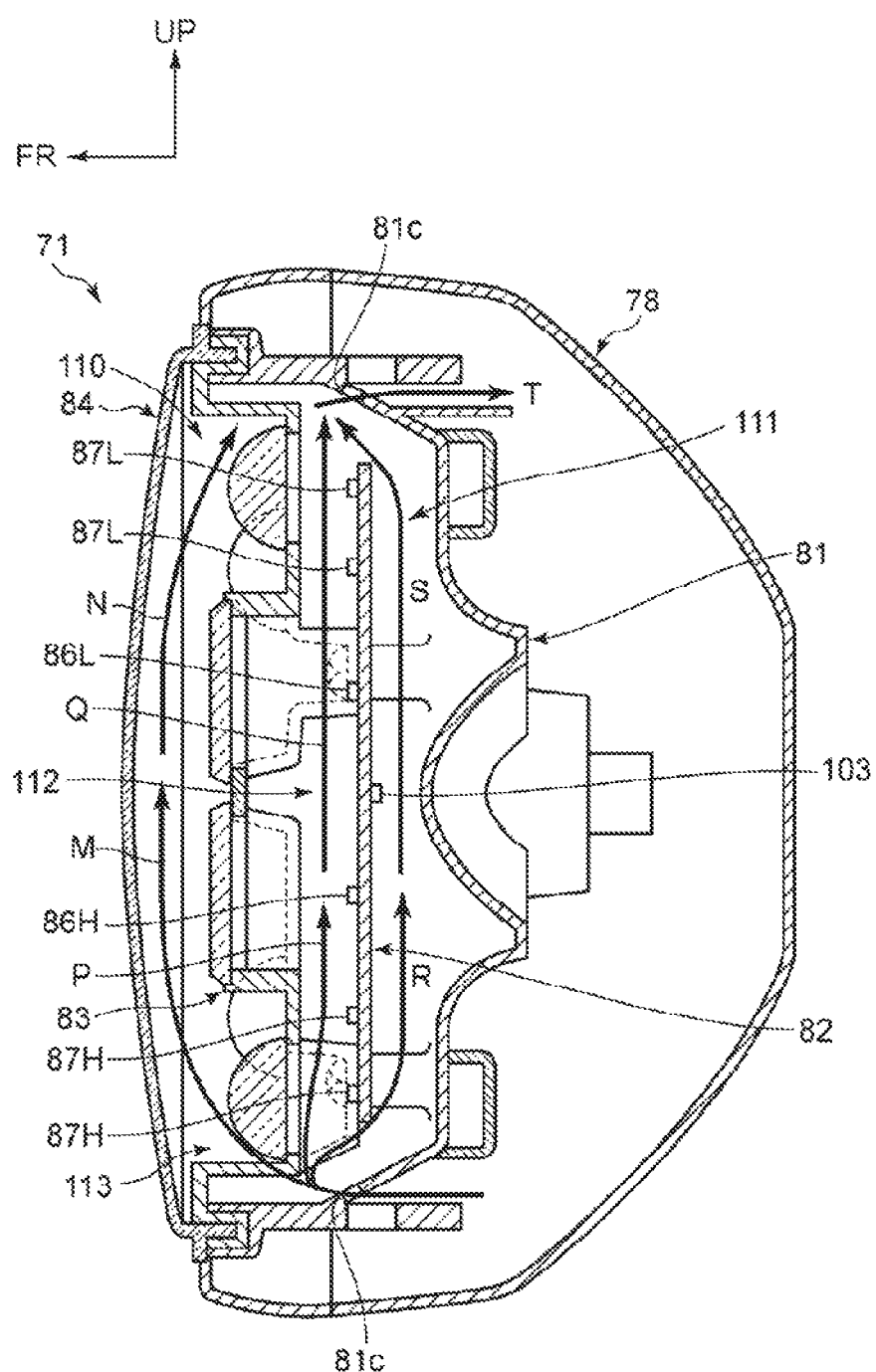
FIG. 8 is a operation diagram illustrating operation of ventilation in the headlight.

FIG. 8 is a operation diagram illustrating operations of ventilation in the headlight 71.

When the LED chips 86H, 86L, 87H, and 87L or the LED chip 103 emits light, air flows from the housing 78 into the headlight 71 through the ventilation holes 81c formed in a lower portion of the lamp body 81 because of convection.

Then, air rises between the lens support 83 and the outer lens 84 as depicted by arrows M and N, and rises between the board 82 and the lens support 83 as depicted by arrows P and Q, and rises between the lamp body 81 and the board 82 as depicted by arrows R and S. Then, air is discharged into the housing 78 from the plurality of ventilation holes 81c of an upper portion of the lamp body 81 as depicted by an arrow T. The housing 78 has a connecting port (not depicted) that is connected to an outside environment. Therefore, heated air is discharged externally from the housing 78, whereas cool outside air flows into the housing 78.

A space 110 surrounded by the lamp body 81 and the outer lens 84 is formed in the headlight 71. The space 110 is made up of a plurality of spaces 111, 112, and 113 that are partitioned by the board 82 and the lens support 83.

That is, the space 111 is formed between the lamp body 81 and the board 82. The space 112 is formed between the board 82 and the lens support 83. The space 113 is formed between the lens support 83 and the outer lens 84.

Thus, the space 110 is divided into the spaces 111, 112, and 113, and each of the spaces 111, 112, and 113 is formed vertically long. This promotes convection and ensures highly efficient ventilation, thus keeping the increase in temperature in the headlight 71 to a minimum.

Further, the LED chips 86H, 86L, 87H, 87L, and 103 are arranged in a distributed manner on the board 82, thus allowing for distribution of heat generated by each of the LED chips 86H, 86L, 87H, 87L, and 103 and keeping the temperature distribution in the space 110 uniform.

As illustrated in FIGS. 2 and 3, the headlight 71 is a lighting apparatus for the motorcycle 10, a vehicle. The headlight 71 includes the lamp body 81 and the outer lens 84 that covers a front area of the lamp body 81. The board 82 is arranged in the space 110 surrounded by the lamp body 81 and the outer lens 84 and has the LED chips 86H, 86L, 87H, 87L, and 103 as LED light sources. The outer lens 84 is round and bends outward in a projection manner at its center. The board 82 having the plurality of LED chips 86H, 86L, 87H, and 87L arranged apart from each other is orthogonal to a direction faced by the outer lens 84, i.e., a forward direction of the headlight 71. Either the Fresnel lenses 88H or 88L are arranged between the board 82 and the outer lens 84 in such a manner as to face at least one of the LED chips 86H, 86L, 87H, and 87L (LED chips 86H or LED chips 86L). The Fresnel lenses 88H and 88L are arranged close to the center of the outer lens 84 in front view. The convex and dome-shaped lenses 89H and 89L are arranged between the board 82 and the outer lens 84 in such a manner as to face the other LED chips 86H, 86L, 87H, and 87L (LED chips 87H or 87L). The convex and dome-shaped lenses 89H and 89L are arranged more circumferentially outward on the outer lens 84 than the Fresnel lenses 88H and 88L in front view. The rear surfaces 89a, LED light source side end portions of the dome-shaped lenses 89H and 89L, are arranged to be offset toward the LED chips 86H, 86L, 87H, and 87L relative to the rear surfaces 88a, LED light source side end portions of the Fresnel lenses 88H and 88L.

The present configuration brings the thin Fresnel lenses 88H and 88L close to the outer lens 84, thus keeping rearward protrusion of the Fresnel lenses 88H and 88L to a minimum. On the other hand, the convex and thick dome-shaped lenses 89H and 89L whose distance to the light sources is easier to adjust than the Fresnel lenses 88H and 88L are arranged more circumferentially outward on the outer lens 84. Arrangement of two kinds of lenses (Fresnel lenses 88H and 88L and dome-shaped lenses 89H and 89L) along the outer front surface of the outer lens 84 contributes to a reduced distance as a whole between the LED chips 86H, 86L, 87H, and 87L and the outer lens 84. This makes the headlight 71 longitudinally less wide despite having the Fresnel lenses 88H and 88L, thus providing the more compact headlight 71. Further, it is possible to secure an amount of light irradiated and an irradiation area of the headlight 71 thanks to the Fresnel lenses 88H and 88L that can irradiate light far and the dome-shaped lenses 89H and 89L that can irradiate light over a large area near the vehicle.

Further, all the LED chips 86H, 86L, 87H, 87L, and 103 are provided directly on the board 82 that is formed in a single plane, contributing to further downsizing and reduction in thickness.

Still further, as illustrated in FIGS. 3 and 5, the headlight 71 includes the lens support 83 supported on the lamp body 81. The lens support 83 includes the front side step portion 83c and the rear side step portion 83d. The front side step portion 83c is formed on the side of the outer lens 84 as the first step portion. The rear side step portion 83d is formed more circumferentially outward than the front side step portion 83c and closer to the LED chips 86H, 86L, 87H, and 87L than the front side step portion 83c as the second step portion. The Fresnel lenses 88H and 88L are provided on the front side step portion 83c, and the dome-shaped lenses 89H and 89L are provided on the rear side step portion 83d. Arrangement of two kinds of lenses (Fresnel lenses 88H and 88L and dome-shaped lenses 89H and 89L) on the lens support 83 having the front side step portion 83c and the rear side step portion 83d provides a simpler parts configuration of the headlight 71 without increasing the parts count of the lens support 83 for each lens (each of the Fresnel lenses 88H and 88L and dome-shaped lenses 89H and 89L), thus keeping the upsizing of the headlight 71 to a minimum.

The Fresnel lenses 88H and 88L are arranged, each in association with one of the plurality of LED chips 86H and 86L arranged close to the center of the board 82 of the LED chips 86H, 86L, 87H, and 87L, and the plurality of adjacent Fresnel lenses 88H and 88L are arranged in proximity to each other as illustrated in FIG. 2, thus contributing to downsizing of the headlight 71 in the diametric direction.

Still further, the LED chips 86H and 86L arranged close to the center of the board 82 are arranged side by side in two directions (vertically and along the vehicle width), thus contributing to further downsizing of the headlight 71 in the diametric direction.

Still further, the LED chips 87H and 87L arranged close to the outer circumference of the board 82 are arranged in an annular manner externally to the LED chips 86H and 86L that are arranged close to the center of the board 82, and the dome-shaped lenses 89H and 89L are provided in association with the LED chips 87H and 87L that are arranged close to the outer circumference of the board 82, and the dome-shaped lenses 89H and 89L are provided, in front view, between the Fresnel lenses 88H and 88L and the outer circumferential edge of the outer lens 84. This allows for the headlight 71 to emit light uniformly along the outer circumference of the round lamp body thanks to the dome-shaped lenses 89H and 89L.

Still further, the outer lens 84 is fitted and fastened to the outer circumferential edge of the lamp body 81, and the support arms 83b are formed in the lens support 83 in such a manner as to extend radially outward in the diametric directions, and the support arms 83b are fastened by being sandwiched between the lamp body 81 and the outer lens 84 as illustrated in FIGS. 2 to 4. This contributes to a smaller parts count and improved appearance thanks to having no blindfold for covering the fastening section as compared to forming a special fastening section of the lens support 83, for example, with a tightening member.

Still further, as illustrated in FIG. 7(B), the LED chip 103 is provided on the surface of the board 82 on the side of the lamp body 81 (rear surface 82b), and the reflector 98 serving as a reflecting mirror section provided on the inner surface 81b of the lamp body 81 reflects light from the LED chip 103, guides light toward the outer lens 84, and irradiates light externally. This allows for the plurality of light sources (the LED chips 86H, 86L, 87H, and 87L serving as light sources of the headlight 71 and the LED chip 103 serving as a light source of the position light 104) that are required in terms of regulations to be provided on the single board 82, thus keeping increase in thickness of the headlight 71 to a minimum as much as possible.

The above embodiment is merely an example of the present invention, and the present invention may be modified and applied at will without departing from the scope of the invention.

For example, although, in the above embodiment, the LED chips 86H and 86L, arranged close to a center of the board 82, are arranged side by side in two directions, i.e., vertically and along the vehicle width, as illustrated in FIG. 2, the present invention is not limited thereto, and the LED chips 86H and 86L may be arranged in other two directions.

Still further, although the four LED chips 86H and 86L are provided on the center side, and the six LED chips 87H and 87L are provided on the outer circumference side, the present invention is not limited thereto.

Still further, the present invention is not limited in application to the motorcycle 10. Instead, the present invention is applicable to saddle type vehicles including other than motorcycle. It should be noted that saddle type vehicles include vehicles in general that are ridden by straddling the vehicle body and include not only motorcycles (including motorized bicycles) but also three- and four-wheeled vehicles classified as all-terrain vehicles (ATVs).

The invention claimed is:

1. A lighting apparatus for a vehicle comprising:
   a lamp body;
   an outer lens configured to cover a front area of the lamp body so as to have a space surrounded by the outer lens and the lamp body; and
   a board disposed in the space surrounded by the lamp body and the outer lens, the board including a plurality of light-emitting diode light sources, wherein
   the outer lens has a substantially circular shape in front view and a convex shape bent frontward, the board includes the plurality of light-emitting diode light sources arranged apart from each other, and the main surface of the board is disposed orthogonal to a direction to which the outer lens faces,
   the lighting apparatus further comprises a Fresnel lens disposed between the board and the outer lens so as to face corresponding one of the light-emitting diode light sources, and the Fresnel lens is disposed close to a center of the outer lens in the front view, and
   the lighting apparatus further comprises a convex and dome-shaped lens disposed between the board and the outer lens so as to face one of the other light source of the plurality of light-emitting diode light sources, and the convex and dome-shaped lens is disposed further outward than the Fresnel lens from the center of the outer lens in the front view, and
   the convex and dome-shaped lens has a first light-emitting diode light source side end portion located on a light-emitting diode light source side thereof, and the Fresnel lens has a second light-emitting diode light source side end portion located on a light-emitting diode light source side thereof, the first light-emitting diode light source side end portion is positioned offset toward the board relative to the second light-emitting diode light source side end portion.

2. The lighting apparatus for a vehicle of claim 1, wherein all the light-emitting diode light sources are provided directly on the board that is formed in a single plane.

3. The lighting apparatus for a vehicle of claim 1, the lighting apparatus comprising:
   a lens support supported by the lamp body, the lens support including
   a first step portion, and
   a second step portion disposed closer to the board than the first step portion and disposed further outward than the first step portion from the center of the outer lens in the front view, wherein
   the Fresnel lens is provided on the first step portion, and the convex and dome-shaped lens is provided on the second step portion.

4. The lighting apparatus for a vehicle of claim 3, wherein the outer lens is fitted and fastened to an outer circumferential edge of the lamp body, and the lens support includes a support arm extending radially outward, and the support arm is fastened by being sandwiched between the outer lens and the outer circumferential edge of the lamp body.

5. The lighting apparatus for a vehicle of claim 1, wherein the Fresnel lens is one of a plurality of Fresnel lenses, each Fresnel lens facing a corresponding one of the plurality of light-emitting diode light sources, adjacent Fresnel lenses of the plurality of the Fresnel lenses are arranged in proximity to each other.

6. The lighting apparatus for a vehicle of claim 5, wherein the light-emitting diode light sources include first light-emitting diode light sources disposed close to the center of the board and arranged side by side in two directions.

7. The lighting apparatus for a vehicle of claim 6, wherein the light-emitting diode light sources include second light-emitting diode light sources disposed closer to an outer circumference of the board than the first light-emitting diode light sources, the second light-emitting diode light sources are arranged in an annular manner outwardly of the first light-emitting diode light sources, and the convex and dome-shaped lens is provided in association with each of the second light-emitting diode light sources, and the convex and dome-shaped lens is positioned, in the front view, between each of the Fresnel lenses and an outer circumferential edge of the outer lens.

8. The lighting apparatus for a vehicle of claim 1, wherein the board includes a rear surface facing the lamp body, the light-emitting diode light sources include a rear light-emitting diode light source provided on the rear surface of the board,
   the lamp body includes a reflecting mirror section provided on an inner surface thereof, the reflecting mirror reflecting light from the rear light-emitting diode light source to guide the light toward the outer lens to irradiate the light externally.

* * * * *